W. RASEY.
Comb-Frames.

No. 143,383. Patented September 30, 1873.

Witnesses
Frank S. Perley
Edward E. Ellis

Inventor
Worster Rasey
Per
T. H. Alexander &
Attys.

UNITED STATES PATENT OFFICE.

WORSTER RASEY, OF REMINGTON, INDIANA.

IMPROVEMENT IN COMB-FRAMES.

Specification forming part of Letters Patent No. 143,383, dated September 30, 1873; application filed August 2, 1873.

*To all whom it may concern:*

Be it known that I, WORSTER RASEY, of Remington, in the county of Jasper and State of Indiana, have invented certain new and useful Improvements in Bee-Hive Frames; and I do hereby declare that the following is a full, clear, and exact description thereof, reference being had to the accompanying drawings and to the letters of reference marked thereon which form a part of this specification.

The nature of my invention consists in the construction and arrangement of a comb-frame with comb-fastener for bee-hives, as will be hereinafter more fully set forth.

In order to enable others skilled in the art to which my invention appertains to make and use the same, I will now proceed to describe its construction and operation, referring to the annexed drawing, in which—

Figure 1:
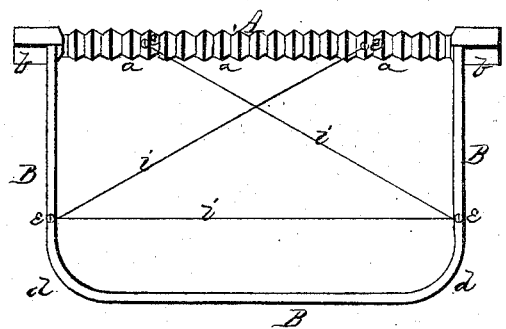
Figure 2:

Figure 1 is a side elevation, and Fig. 2 is an end view.

A represents the top bar of the frame. The body or main portion of this bar is turned so as to form a series of circumferential sharp edges, $a\ a$, from near one end to near the other, forming an artificial comb-guide for the bees to build their comb. This comb guide or bar being round, there is no place for the bees to connect two combs on the one frame, which has caused so much trouble in extracting their honey and also in removing the frames from one hive to another. The ends of the bar A are left square, while the body is turned, and the under side of each end is beveled on both sides, forming a sharp edge, $b$, in the center, so that, when the frame is placed in the hive and hung upon the cleats for its reception, the edges $b\ b$ will be the only portions which touch the cleats, thus preventing the bees from fastening the frame to the hive. The sides and bottom of the frame are formed of a single bar, B, bent so as to form the curved corners $d\ d$ of the frame; and the ends of the bar B are inserted and fastened, by any suitable means, in slots made in the top bar A, a suitable distance from each end. In each side of the frame thus constructed are fastened screws or pins $e\ e$ at any desired points, and around the same is passed a fine wire, $i$. The wires $i\ i$ form a comb-fastener to fasten old brood-comb in the frames when we transfer from old hives to new.

Having thus fully described my invention, what I claim as new, and desire to secure by Letters Patent, is—

1. A comb-frame for bee-hives formed of the top bar A turned to form the circumferential sharp edges $a\ a$, and having the edge $b$ at each end on the under side, and the bar B bent to form the round corners $d\ d$, all as herein set forth.

2. The combination, with the comb-frame A B, of the screws or pins $e\ e$ and wires $i\ i$, as and for the purposes herein set forth.

In testimony that I claim the foregoing as my own, I affix my signature in presence of two witnesses.

WORSTER RASEY.

Witnesses:
DAVID H. PATTON,
J. D. FOSTER.